US009124850B1

(12) United States Patent
Stevenson et al.

(10) Patent No.: US 9,124,850 B1
(45) Date of Patent: Sep. 1, 2015

(54) STRUCTURING AND DISPLAYING ENCODING PARAMETERS, STREAMING AND/OR ARCHIVAL GROUP SETTINGS AND OUTPUT TARGET SETTING

(75) Inventors: Davis Stevenson, Portland, OR (US); Gregory Truax, Portland, OR (US); David S. Montgomery, Portland, OR (US); Michael Callahan, Lake Oswego, OR (US)

(73) Assignee: Elemental Technologies, Inc., Portland, OR (US)

( * ) Notice: Subject to any disclaimer, the term of this patent is extended or adjusted under 35 U.S.C. 154(b) by 724 days.

(21) Appl. No.: 13/230,028

(22) Filed: Sep. 12, 2011

Related U.S. Application Data

(60) Provisional application No. 61/438,319, filed on Feb. 1, 2011.

(51) Int. Cl.
*H04N 5/445* (2011.01)
*H04N 21/462* (2011.01)
*H04N 21/482* (2011.01)

(52) U.S. Cl.
CPC ....... *H04N 5/44543* (2013.01); *H04N 21/4622* (2013.01); *H04N 21/482* (2013.01)

(58) Field of Classification Search
CPC ............... G06F 17/30035; G06F 17/30041; G06F 21/10; G06F 2221/0704; G06Q 10/10; G06Q 30/0244; G06Q 30/0267; G06Q 30/0269; G06Q 30/0277; G06Q 3/0481; H04H 20/26; H04H 60/91; H04H 65/1059; H04H 65/4076; H04H 65/4084; H04H 65/602; H04H 65/605; H04H 65/80; H04H 67/30; H04N 21/41407; H04N 21/6112; H04N 21/6125; H04N 21/6408
USPC ................... 705/14.43, 14.64, 14.66, 14.73; 707/E17.009, 999.102; 715/201, 702, 715/780, 810, 815, 828
See application file for complete search history.

(56) References Cited

U.S. PATENT DOCUMENTS

| | | | |
|---|---|---|---|
| 7,665,036 B1 * | 2/2010 | Lin et al. | 715/810 |
| 2002/0188772 A1 * | 12/2002 | Radcliffe et al. | 710/38 |
| 2008/0201225 A1 * | 8/2008 | Maharajh et al. | 705/14 |

* cited by examiner

*Primary Examiner* — Sath V Perungavoor
*Assistant Examiner* — Dakshesh Parikh
(74) *Attorney, Agent, or Firm* — Christopher P. Maiorana, PC

(57) ABSTRACT

An apparatus including a first module and a second module. The first module may be configured to receive video and audio content and process the video and audio content for distribution with video and audio encoding to various media platforms based upon a plurality of predefined settings. The second module may be configured to generate a single-page user interface through which a user may set the predefined settings.

20 Claims, 6 Drawing Sheets

500

STREAM 2 ⊗ ▶ OUTPUTS
▼ ADVANCED

PRESET CATEGORY
[SELECT CATEGORY ▼]

USE PRESET
[SELECT PRESET ▼]

GPU         RESOLUTION        STRETCH    ANTI-      VIDEO CODEC
                              TO OUTPUT  ALIAS
[AUTO ▼]    [400] w X [224] h    ☐         ☒       [MPEG-4 AVC (H.264) ▼]

VIDEO

VBI              TIMECODE    RESPOND     INSERT AFD
PASSTHROUGH      INSERTION   TO AFD      SIGNALING
☐                ☐           [NONE ▼]    [NONE ▼]

FRAMERATE                                                    INTERPOLATED
[29.970 ▼]                   [30000] / [1001]                     ☐

PIXEL ASPECT RATIO
[29.970 ▼]                   [1] / [1]

RATE CONTROL MODE    BITRATE                     MAX BITRATE
[CBR ▼]              [800000]      bits/s        [            ] bits/s LOOKAHEAD            BUFFER SIZE                 INITIAL BUFFER FILL %
[0]     FRAMES       [1600000]     bits          [        ]

NO. OF B     CLOSED GOP   REFERENCE
GOP MODE    GOP SIZE         FRAMES       CADENCE      FRAMES
[FIXED ▼]   [90]    FRAMES   [0]          [1]          [1]

SCENE CHANGE DETECT   INTERLACE MODE       FORCE FIELD PICTURES
☒                     [PROGRESSIVE ▼]      ☐

START QP    MIN QP     MAX QP
[0]         [1]        [1]

PROFILE         LEVEL
[BASELINE ▼]    [3 ▼]

CABAC       SLICES            ADAPTIVE QUANTIZATION
☐           [1]                [MEDIUM ▼]

▶ PREPROCESSORS

FIG. 5B

STRUCTURING AND DISPLAYING ENCODING PARAMETERS, STREAMING AND/OR ARCHIVAL GROUP SETTINGS AND OUTPUT TARGET SETTING

This application claims the benefit of U.S. Provisional Application No. 61/438,319, filed Feb. 1, 2011 and is hereby incorporated by reference in its entirety.

FIELD OF THE INVENTION

The present invention relates to digital video and audio generally and, more particularly, to a method and/or architecture for structuring and displaying encoding parameters, streaming and/or archival group settings, and output target setting.

BACKGROUND OF THE INVENTION

In conventional systems, output target settings and stream settings are encapsulated together as a single entity, which requires repetitively filling out video and audio settings if multiple output targets share the same stream settings. Explicitly specifying individual stream settings for each output target requires duplication of information in the case that output targets within different streaming groups share the same stream settings. The duplication of information requires more space to store the object model, as well as inconveniences the user with additional input steps. The duplication of information also leaves open the possibility of typographical errors.

Another option is to have a more complicated multipage or tabbed setup, where various components are individually defined and then connected together later. The ability to access all of the data on a single page is not available. Spreading settings fields out among multiple distinct user interface (UI) pages prevents users from easily visualizing the overall structure of the final settings, and requires additional input steps from the user. This structure is also less intuitive to the user.

SUMMARY OF THE INVENTION

The present invention concerns an apparatus including a first module and a second module. The first module may be configured to receive video and audio content and process the video and audio content for distribution with video and audio encoding to various media platforms based upon a plurality of predefined settings. The second module may be configured to generate a single-page user interface through which a user may set the predefined settings.

The objects, features and advantages of the present invention include providing a method and/or architecture for structuring and displaying encoding parameters, streaming and/or archival group settings, and output target setting that may (i) reduce data duplication, (ii) minimize setup of video and audio settings by allowing multiple output targets to share the same stream settings, (iii) enhance user interaction by providing a single page user interface, (iv) structure a layout of the user interface to logically follow an underlying object model, and/or (v) allow overall structure of the created object to be seen at a glance.

BRIEF DESCRIPTION OF THE DRAWINGS

These and other objects, features and advantages of the present invention will be apparent from the following detailed description and the appended claims and drawings in which:

FIGS. 5A-5C are a diagrams illustrating a more detailed example of a user interface (UI) layout in accordance with the present invention.

DETAILED DESCRIPTION OF THE PREFERRED EMBODIMENTS

Figure 1:
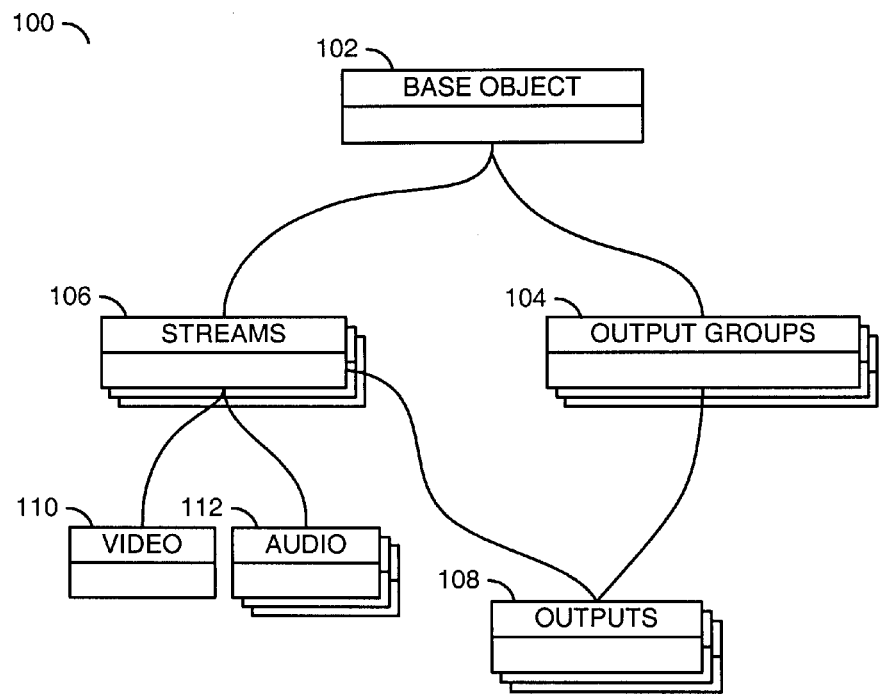
FIG. 1 is a diagram illustrating an example object model.

Referring to FIG. 1, a high-level diagram of an object model 100 is shown in accordance with a preferred embodiment of the present invention. In one embodiment, the present invention may provide a process (or method) of structuring and displaying encoding parameters, streaming and/or archival group settings, and output target setting(s) that may be implemented to meet a few basic goals including but not limited to (i) reducing data duplication, (ii) minimizing setup of video and audio settings by allowing multiple output targets to share the same stream settings, (iii) enhancing user interaction by providing a single page user interface, (iv) structuring a layout of the user interface to logically follow an underlying object model, and/or (v) allowing overall structure of the created object to be seen at a glance. The present invention provides an object model and physical conceptualization that takes into account the above goals. The object model 100 generally reduces data duplication and minimizes setup of video and audio settings by allowing multiple output targets to share the same stream settings. The object model 100 generally provides implicit settings for Output Groups, Outputs, Video, and Audio models. In an embodiment of the present invention, a single page user interface (UI) may be constructed that logically follows the object model 100, allows multiple output targets to share the same stream settings, and allows an overall structure of the created object to be seen at a glance.

In one example, the object model 100 may comprise a block 102, one or more blocks 104, one or more blocks 106, one or more blocks 108, one or more blocks 110, and zero or more blocks 112. The block 102 may be configured to specify a base object. The one or more blocks 104 may be configured to specify output groups. The one or more blocks 106 may be configured to specify streams. The one or more blocks 108 may be configured to specify outputs. The one or more blocks 110 may be configured to specify video parameters. The zero or more blocks 112 may be configured to specify audio parameters. The block 102 may be linked to the one or more blocks 104 and the one or more blocks 106. Each of the one or more blocks 106 may be linked to a single block 110 and zero or more blocks 112. Each of the one or more blocks 108 may be linked to one block 104 and one block 106.

Figure 2:
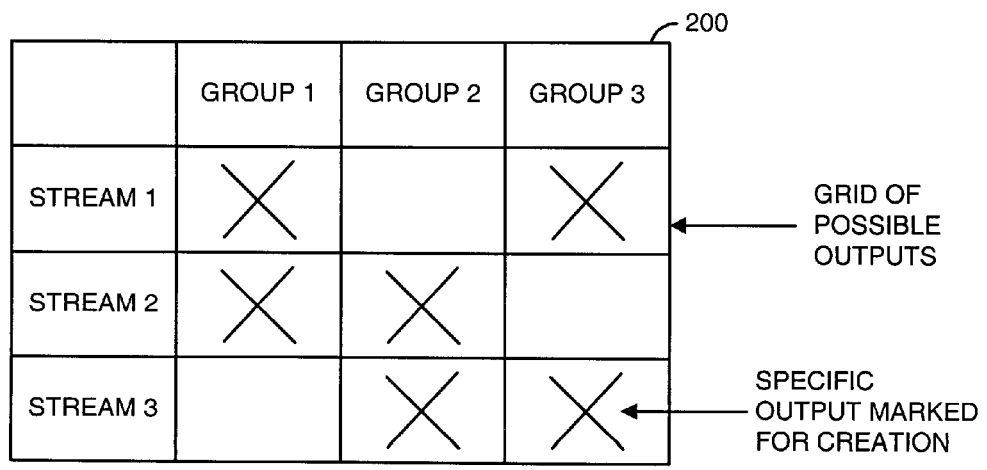
FIG. 2 is a diagram illustrating an example grid layout.

Referring to FIG. 2, a diagram of a grid formation 200 is shown illustrating a grid concept in accordance with an example embodiment of the present invention. A physical conceptualization may be realized using the object model 100 and a few criteria. In one example, the criteria may include that at least one output should be present and that no output should share the same group (G) and stream (S) with another output. Based on these criteria, the maximum number of outputs is one for each group/stream pair, or $(G_N \times S_N)$, where $G_N$ represents the number of groups and $S_N$ represents the number of streams.

In one example, the groups, streams and outputs may be laid out as illustrated by the grid formation 200. The grid formation 200 generally allows all objects to be seen at once and makes the connections between the objects clear. All possible outputs available for a set of streams and groups are generally visible at the same time. An output may then have a binary state indicating whether the output exists or not. Visualizing the object model 100 as a grid generally provides a layout that allows users to easily see the high-level structure being created, which the conventional multipage form cannot provide.

Figure 3:
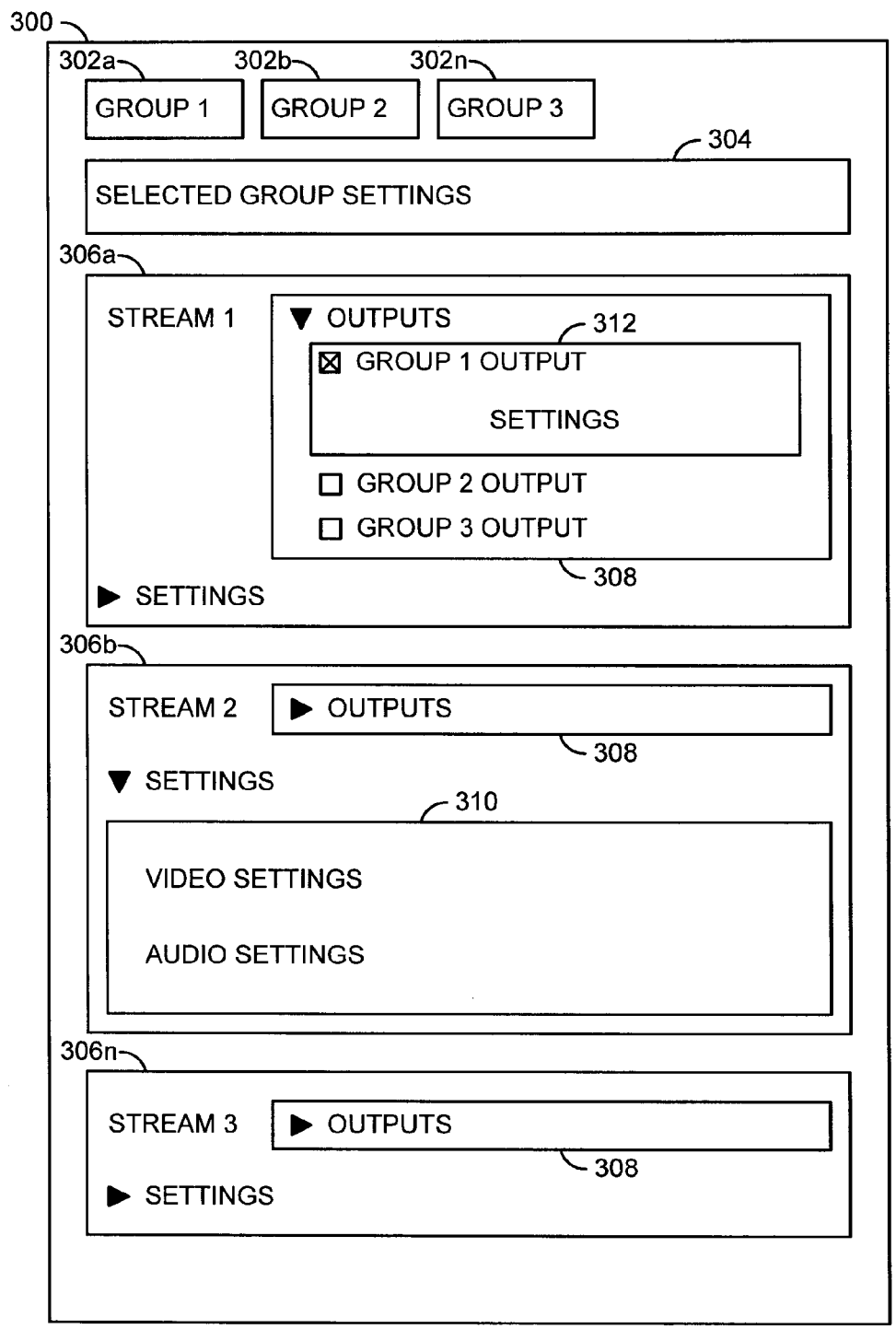
FIG. 3 is a diagram illustrating a top level visualization of an example user interface (UI) layout.

Referring to FIG. 3, a diagram of a page 300 is shown illustrating a single page user interface (UI) in accordance with an example embodiment of the present invention. Creating a single-page user interface from the physical conceptualization (described above in connection with FIG. 2) is generally difficult due to the large number of settings fields needed to create the groups, outputs, and, most importantly, video and audio settings. Displaying all of the input fields generally takes a great deal of physical space. The great deal of physical space needed may prevent the user interface from easily displaying the entire structure to the user. In order to overcome this issue, the user interface may employ toggles (e.g., illustrated as solid triangles) to expand and collapse certain areas containing settings. Collapsing all the setting areas allows the user to see the top-level structure. Setting areas may be expanded out to display more detail as needed.

In one example, the single-page user interface 300 may comprise elements including a plurality of areas (or fields) 302a-302n, an area (or field) 304, and a plurality of areas (or fields) 306a-306n. The user interface elements may be used in a device (or product) implementing an embodiment of the present invention when creating or editing objects (e.g., live event objects, profile objects, etc.). Structuring the data and user interface presentation layer in this way generally reduces data storage, improves user interaction, and more explicitly encapsulates the concept of multiple output targets across multiple groups sharing a single set of stream settings. While the conceptual object model 100 lends itself to the grid formation 200, the actual user interface need not follow the grid structure rigidly.

The implementation of the single-page user interface 300 may pull away from the grid concept in a few ways, but does not alter the basic underlying concept. There are also other configuration choices that may be been made while still falling within the general concept presented herein. In order to allow physical space in the user interface for the output group settings fields, the output groups may, in one example, be pulled away from the grid structure illustrated in FIG. 2 and placed towards the top of the user interface page 300. The space for group settings may be overlapped. For example, the areas 302a-302n may be implemented as buttons that may be used to select which group settings appear in the area 304. Alternatively, the area 304 may be implemented with tabs along the top to navigate between group settings.

In order to provide physical space in the user interface page 300 for settings associated with the streams, the areas 306a-306n may be arranged vertically to allow each stream field to use the entire horizontal width of the user interface page 300. The areas 306a-306n are illustrated as being vertically separated for clarity. The areas 306a-306n may be implemented abutting one another to save further space. In one example, a vertical scroll bar (not shown) may be implemented along the vertical edge of the user interface page 300 to facilitate visualization of a greater number of areas 306a-306n than may fit within the entire vertical height of a screen displaying the user interface page 300. Within each area 306a-306n an area (or field) 308 may be implemented for setting and displaying group output settings. In order to provide physical space in the user interface page 300 for the output settings as well as taking into account the horizontal space limitation of the user interface page 300, the grid of outputs within a single stream may be rotated 90 degrees (e.g., presented vertically instead of horizontally as in the grid formation 200 of FIG. 2). In another example, a similar user interface page without the rotation may also be implemented. The rotation is advantageous because as the number of output groups grows, eventually the user interface would run out of horizontal space and need horizontal scrolling. Horizontal scrolling is not as easily managed as vertical scrolling.

Within each area 306a-306n another area (or field) 310 may be implemented for setting and displaying video and audio settings of a particular stream. The physical space used for video and audio settings of a particular stream may be significant. An expanding and collapsing area taking up the entire width of the user interface page 300 may be used to store the video and audio settings of a particular stream. When collapsed, the user interface page 300 has little deviation from the grid formation 200 and an overall view of how the groups, streams and outputs interconnect may be seen. When the area 310 is expanded, an overall view of the video and audio settings of a single stream may be seen.

In order to save physical space, the settings of a particular output may be shown only when the particular output has been marked for creation (e.g., indicated by an 'X' in a selection box). In one example, when the area 308 is expanded an area (or field) 312 may be presented showing the settings of the particular output. The area 312 may be further configured to allow the user to input the settings for the particular output.

Figure 4:
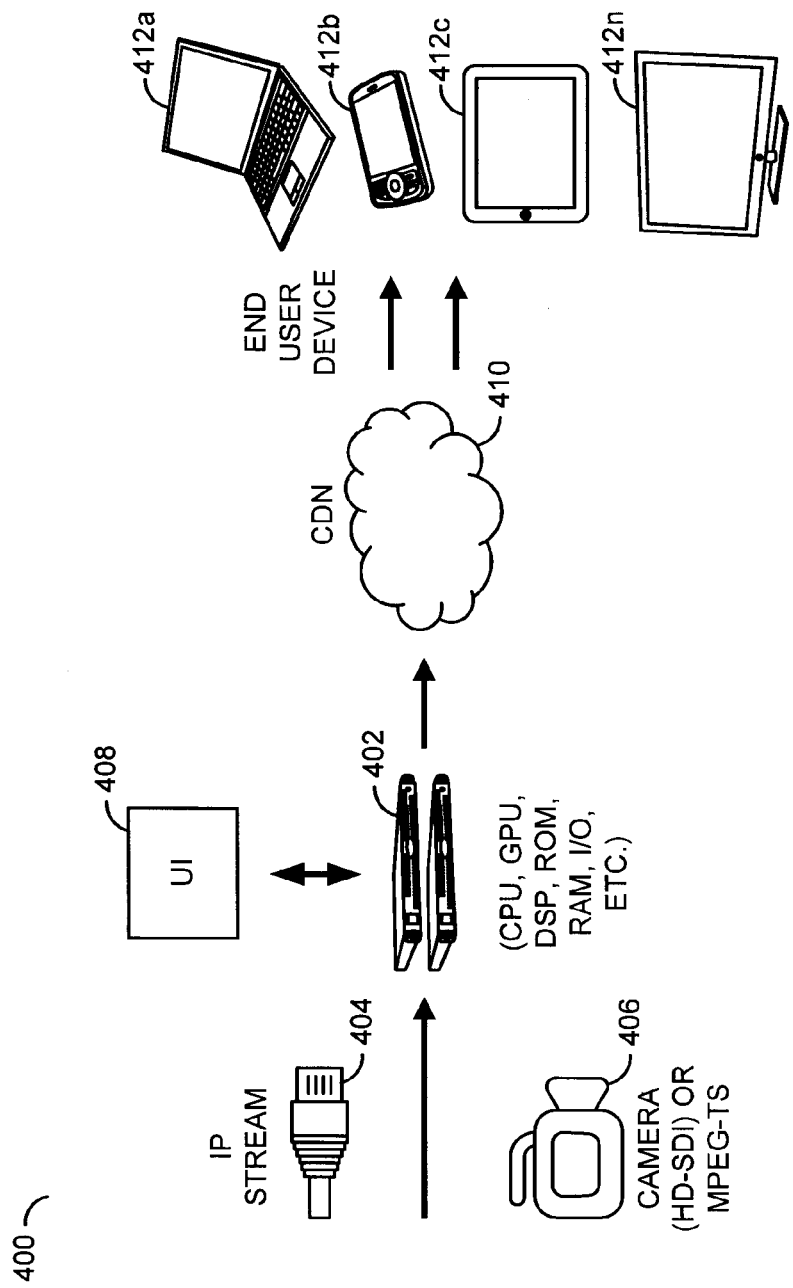
FIG. 4 is a diagram illustrating an example system in which an embodiment of the present invention may be implemented.

Referring to FIG. 4, a block diagram of a system 400 is shown illustrating a context in which embodiments in accordance with the present invention may be implemented. In one example, the system 400 may comprise one or more processing units 402. The processing units 402 may be configured to receive one or more IP streams 404 and/or live content (e.g., camera output, HD-SDI, MPEG-TS, etc.) 406 from the customer location. The processing units 402 may be setup and controlled via a user interface (UI) 408. The processing units 402 may be configured (e.g., through software, firmware, program modules, hard coding, etc.) to generate the user interface 408. The user interface 408 may be implemented as a single-page user interface as described above in connection with FIG. 3. In one example, the user interface 408 may be implemented as an HTML interface accessible, for example, via a web browser. In another example, the user interface 408 may be implemented as a REST XML interface. The user interface 408 generally structures data based upon the object model 100 (described above in connection with FIG. 1). However, other single-page interfaces may be implemented accordingly to meet the design criteria of a particular implementation.

The system 400 may further comprise a network 410, and end user devices 412a-412n. The one or more processing units 402 may be implemented, in one example, as a massively parallel video processing system configured to provide content distribution with video and audio encoding for live streaming to various media platforms. The processing units 402 may support, for example, adaptive bit-rate protocols, HTML5, and multiple HD streams. In one example, the processing units 402 may comprise one or more modules, that may include, but are not limited to a processor, a central processing unit (CPU), a digital signal processor (DSP), a graphics processing unit (GPU), random access memory (RAM), read only memory (ROM), a storage medium or media, video encoders or codecs, audio encoders or codecs, device interfaces, network interfaces, etc. In one example, the processing units 402 may be implemented using one or more Elemental™ Live appliances from Elemental Technologies Inc., Portland, Oreg. The processing units 402 (e.g., single or clustered) may be located on the premises of the user (e.g., tier 1 customers) or content provider. In one example, the processing units 402 may present streams (e.g., HD, SD, etc. to the network 410. In another example, the processing units 402 may also present streams to an archive (e.g., stored on one or more storage media).

In one example, the network 410 may be implemented as one or more content distribution networks (CDNs). In another example, the network 410 may be implemented as one or more streaming servers. In still another example, the network 410 may be implemented as a mobile carrier network. However, other networks and/or combinations of networks may be implemented accordingly to meet the design criteria of a particular implementation. The end user devices 412a-412n may be implemented using any of a number of device types. For example, the end user devices 412a-412n may include, but are not limited to, laptops, tablets, desktop computers, smart phones, PDAs, set-top-boxes (STBs), televisions, etc.

In one example, the system 400 may be configured to communicate the IP stream(s) 404 and/or live content 406 from the customer location to one or more of the end user devices 412a-412n based upon settings provided to the processing units 402 via the user interface 408. For example, the processing units 402 may be configured to provide a variety of device-optimized streams. The processed content may be communicated from the processing units 402 to the network 410 for distribution to the end user devices 412a-412n. However, other configurations may be implemented accordingly to meet the design criteria of a particular distribution system.

Figure 5A:
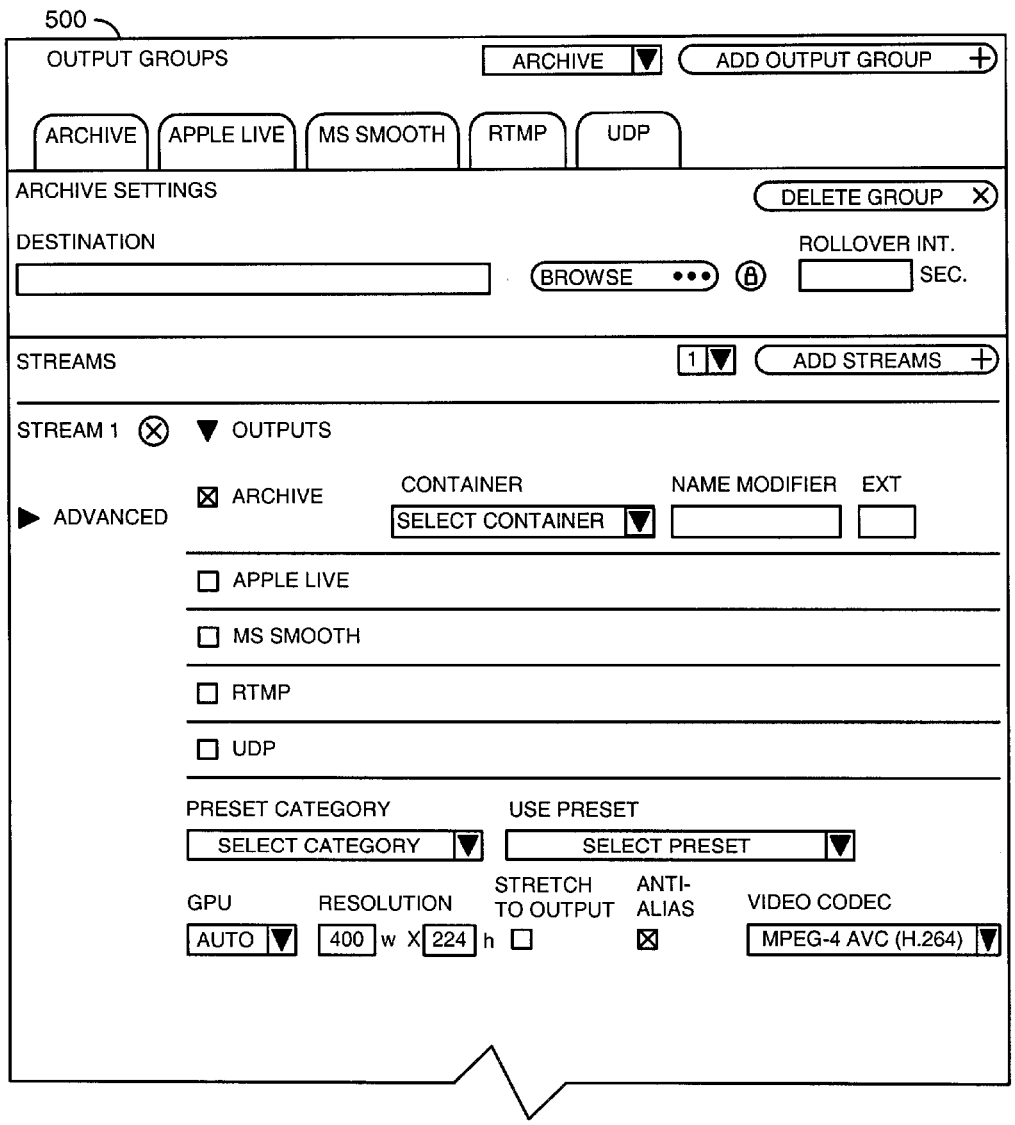
Figure 5C:

Referring to FIGS. 5A-5C, diagrams are shown illustrating a more detailed example of a user interface (UI) layout 500 in accordance with an embodiment of the present invention. The user interface (UI) layout 500 illustrates an example structure similar to the user interface page 300 of FIG. 3. The user interface layout is a single-page layout, but is spread over the three figures for clarity. For example, the single-page user interface layout 500 illustrates an interface with three streams in varying toggle states. Five output groups are illustrated for example, however, other numbers and types may be implemented accordingly to meet the design criteria of a particular implementation.

In one example, the interface may present output groups as a number of tabs (e.g., Archive, Apple Live, MS Smooth, RTMP, UDP, etc.). Selecting the tab for a particular output group displays the settings for that output group. For example, selection of the Archive tab causes the archive settings to be displayed below the tabs. Selection of the output group to be displayed may also be done using a pull-down list. A button (or tab) may also be presented for adding and/or deleting output groups on the interface page.

By expanding an output portion of a particular stream region, details about the outputs associated with the particular stream are shown. For example, an example of the output detail for Stream 1 is illustrated in FIG. 5A. Similarly, an example advanced portion for the Stream 2 is illustrated in FIGS. 5B and 5C. For example, FIGS. 5B and 5C illustrate a view of the Stream 2 details with the outputs portion contracted and the advanced portion expanded to show video details (FIG. 5B) and audio details (FIG. 5C). FIG. 5C also illustrates an example of the Stream 3 portion with both output and advanced portions contracted. Each of the regions of the user interface layout 500 may include fields for a user to select and/or enter the various parameters associated with configuration of the processor units 402. The fields and parameters illustrated in FIGS. 5A-5C are for example and not meant to define required parameters or limit the interface to the particular parameters illustrated.

In one embodiment of the present invention, an audio/video communication system may be implemented that uses a grid concept in accordance with the present invention to layout the user interface (UI). For example, the system may be implemented with a single-page user interface (UI) for object creation. Another embodiment may provide an object creation method (or process) that reduces unnecessary data duplication (which relies on an underlying object model) within the single-page user interface.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    one or more processing units configured to receive video and audio content and process said video and audio content for distribution with video and audio encoding to various media platforms based upon a plurality of predefined settings; and
    a user interface generated by said one or more processing units, wherein said user interface is generated as a single-page user interface through which a user sets said predefined settings, said single-page user interface is enabled to expand and collapse areas containing said predefined settings, and when said areas are collapsed said single-page user interface presents a top level structural view enabling said user to visualize all outputs available for a set of streams and output groups of an object model at the same time, with the output groups represented by respective buttons or tabs arranged across a top horizontal dimension of the single-page user interface and the streams represented by areas arranged vertically to allow each stream field to use the entire horizontal width of the single-page user interface.

2. The apparatus according to claim 1, wherein said predefined settings comprise one or more of encoding parameters, streaming settings, archival group settings, and output target settings.

3. The apparatus according to claim 1, wherein said predefined settings are configured for one output for each group/stream pair.

4. The apparatus according to claim 1, wherein said single-page user interface allows multiple output targets to share the same stream settings.

5. The apparatus according to claim 1, wherein said single-page user interface comprises one or more fields that expand and contract in response to a user input.

6. The apparatus according to claim 1, wherein said apparatus is part of a video and audio distribution system.

7. The apparatus according to claim 1, wherein said one or more processing units process said content for live streaming.

8. The apparatus according to claim 1, wherein said one or more processing units comprise a massively parallel video processing system.

9. The apparatus according to claim 1, wherein said for one or more processing units support one or more of adaptive bit-rate protocols, HTML5, and multiple high definition (HD) streams.

10. An apparatus comprising:
    means for receiving video and audio content and processing said video and audio content for distribution with video and audio encoding to various media platforms based upon a plurality of predefined settings; and
    means for generating a user interface for said receiving and processing means, wherein said user interface is generated as a single-page user interface through which a user sets said predefined settings, said single-page user interface is enabled to expand and collapse areas containing said predefined settings, and when said areas are collapsed said single-page user interface presents a top level structural view enabling said user to visualize all possible outputs available for a set of streams and output groups of an object model at the same time, with the output groups represented by respective buttons or tabs arranged across a top horizontal dimension of the single-page user interface and the streams represented by areas arranged vertically to allow each stream field to use the entire horizontal width of the single-page user interface.

11. A method for structuring and displaying encoding parameters, streaming and/or archival group settings, and output target setting comprising the steps of:
    receiving video and audio content;
    processing said video and audio content for distribution with video and audio encoding to various media platforms based upon a plurality of predefined settings; and
    generating a user interface, wherein said user interface is generated as a single-page user interface through which said predefined settings are set, said single-page user interface is enabled to expand and collapse areas containing said predefined settings, and when said areas are collapsed said single-page user interface presents a top level structural view enabling a user to visualize all possible outputs available for a set of streams and output groups of an object model at the same time, with the output groups represented by respective buttons or tabs arranged across a top horizontal dimension of the single-page user interface and the streams represented by areas arranged vertically to allow each stream field to use the entire horizontal width of the single-page user interface.

12. The method according to claim 11, wherein said predefined settings are configured for one output for each group/stream pair.

13. The method according to claim 11, wherein said single-page user interface allows multiple output targets to share the same stream settings.

14. The method according to claim 11, wherein said single-page user interface comprises one or more fields that expand and contract in response to a user input.

15. The method according to claim 11, wherein said video and audio content is processed for live streaming.

16. The method according to claim 11, wherein said processing is performed using a massively parallel video processing system.

17. The method according to claim 11, wherein said processing supports one or more of adaptive bit-rate protocols, HTML5, and multiple high definition (HD) streams.

18. The apparatus according to claim 1, wherein said one or more processing units are configured to connect to distribute encoded video and audio to said various media platforms using one or more of a content distribution network (CDN), a streaming server, and a mobile carrier network.

19. The apparatus according to claim 1, wherein said single-page user interface encapsulates a conceptual model of multiple output targets across multiple output groups sharing a single set of stream settings.

20. The apparatus according to claim 1, wherein said single-page user interface is configured to present output group and stream settings in an orthogonal arrangement allowing visualization of said object model.

* * * * *